(12) United States Patent  
Anraku et al.

(10) Patent No.: US 11,292,510 B2  
(45) Date of Patent: Apr. 5, 2022

(54) STEERING CONTROL DEVICE AND METHOD FOR CONTROLLING STEERING DEVICE

(71) Applicants: JTEKT CORPORATION, Osaka (JP); TOYOTA JIDOSHA KABUSHIKI KAISHA, Toyota (JP)

(72) Inventors: Koji Anraku, Okazaki (JP); Isao Namikawa, Okazaki (JP); Yusuke Kakimoto, Okazaki (JP); Yoshio Kudo, Machida (JP)

(73) Assignees: JTKEKT CORPORATION, Osaka (JP); TOYOTA JIDOSHA KABUSHIKI KAISHA, Toyota (JP)

(*) Notice: Subject to any disclaimer, the term of this patent is extended or adjusted under 35 U.S.C. 154(b) by 66 days.

(21) Appl. No.: 16/790,514

(22) Filed: Feb. 13, 2020

(65) Prior Publication Data

US 2020/0269903 A1 Aug. 27, 2020

(30) Foreign Application Priority Data

Feb. 27, 2019 (JP) .............................. JP2019-034710

(51) Int. Cl.
*B62D 5/04* (2006.01)
*B62D 6/00* (2006.01)
*B62D 6/04* (2006.01)

(52) U.S. Cl.
CPC ............ *B62D 5/046* (2013.01); *B62D 6/008* (2013.01); *B62D 6/04* (2013.01)

(58) Field of Classification Search
CPC .... B62D 5/0463; B62D 5/0466; B62D 6/008; B62D 6/04
See application file for complete search history.

(56) References Cited

U.S. PATENT DOCUMENTS 6,176,341 B1 * 1/2001 Ansari ................... B62D 5/001  
    180/402  
2004/0193344 A1 * 9/2004 Suzuki ................. B62D 5/0484  
    701/41

(Continued)

FOREIGN PATENT DOCUMENTS

DE           102 61 001 A1    7/2004  
DE    10 2005 049 042 A1    4/2006

(Continued)

OTHER PUBLICATIONS

Jul. 17, 2020 Extended Search Report issued in European Patent Application No. 20159043.7.

*Primary Examiner* — Thomas G Black  
*Assistant Examiner* — Sara J Lewandroski  
(74) *Attorney, Agent, or Firm* — Oliff PLC

(57) ABSTRACT

A steering control device includes an electronic control unit. The electronic control unit controls operation of a steering-side motor so as to apply a steering reaction force that resists a steering operation input to the steering wheel. The electronic control unit computes an obstruction strike reaction force for regulating a steering operation that steers a steered wheel toward an obstruction. The electronic control unit generates determination information indicating that the steered wheel is struck by an obstruction. The determination information includes first determination information indicating that the left side of the steered wheel is struck by an obstruction, and second determination information indicating that the right side of the steered wheel is struck by an obstruction. The electronic control unit sets a direction in which the obstruction strike reaction force is applied based on the generated determination information.

2 Claims, 6 Drawing Sheets

(56) References Cited

U.S. PATENT DOCUMENTS

| | | | |
|---|---|---|---|
| 2004/0211618 A1* | 10/2004 | Ogawa | B62D 6/008 180/402 |
| 2004/0262071 A1* | 12/2004 | Duits | B66F 9/07568 180/402 |
| 2005/0017664 A1* | 1/2005 | Takahashi | B62D 6/008 318/432 |
| 2006/0042860 A1* | 3/2006 | Endo | B62D 6/008 180/412 |
| 2006/0080016 A1* | 4/2006 | Kasahara | B62D 6/001 701/41 |
| 2013/0245890 A1* | 9/2013 | Kageyama | B62D 7/18 701/41 |
| 2015/0210318 A1* | 7/2015 | Takeda | B62D 6/003 701/41 |
| 2017/0066475 A1* | 3/2017 | Kudo | B62D 6/008 |
| 2017/0113720 A1* | 4/2017 | Kodera | B62D 5/0472 |
| 2017/0267276 A1 | 9/2017 | Kodera et al. | |
| 2018/0287538 A1* | 10/2018 | Nakashima | B62D 5/0463 |
| 2019/0092377 A1* | 3/2019 | Shin | B62D 5/006 |
| 2019/0126971 A1* | 5/2019 | Kim | B62D 15/0215 |
| 2019/0176883 A1* | 6/2019 | Stanford | B62D 6/008 |
| 2019/0367084 A1* | 12/2019 | Hong | B62D 5/0469 |
| 2020/0062307 A1* | 2/2020 | Min | B60T 8/1764 |
| 2020/0070872 A1* | 3/2020 | Ushiro | B62D 5/04 |
| 2020/0377152 A1* | 12/2020 | Taniguchi | B62D 5/046 |
| 2021/0309292 A1* | 10/2021 | Suzuki | B62D 6/002 |

FOREIGN PATENT DOCUMENTS

| | | |
|---|---|---|
| EP | 1 470 989 A2 | 10/2004 |
| JP | 2017-165219 A | 9/2017 |
| KR | 10-2019-0001043 A | 1/2019 |

\* cited by examiner

STEERING CONTROL DEVICE AND METHOD FOR CONTROLLING STEERING DEVICE

CROSS-REFERENCE TO RELATED APPLICATION

This application claims priority to Japanese Patent Application No. 2019-034710 filed on Feb. 27, 2019, incorporated herein by reference in its entirety.

BACKGROUND

1. Technical Field

The present disclosure relates to a steering control device and a method for controlling a steering device.

2. Description of Related Art

There is a steering device of a steer-by-wire type in which power transmission to and from a steering portion that is operated by a driver is separated from power transmission to and from a steered portion that steers steered wheels in accordance with an operation by the driver. In such a steering device, a road surface reaction force etc. received by the steered wheels is not mechanically transmitted to a steering wheel. In some steering control devices that control the steering device of the steer-by-wire type, a steering reaction force determined in consideration of road surface information is applied to the steering wheel using a steering-side motor to communicate the road surface information to the driver.

Japanese Unexamined Patent Application Publication No. 2017-165219 (JP 2017-165219 A) discloses a steering control device that places a focus on an axial force that acts on a steered shaft coupled to steered wheels, and that sets a steering reaction force in consideration of a distributed axial force obtained by distributing an ideal axial force, which is calculated from a target steered angle that matches a target steering angle for a steering wheel, and a road surface axial force, which is calculated from a drive current of a steered-side motor, at predetermined distribution ratios.

In the steering control device according to JP 2017-165219 A, an end reaction force that relieves a so-called end strike impact, with which a rack end that is an end portion of a rack shaft strikes a rack housing, is added to the distributed axial force as a reaction force component to be considered when setting the steering reaction force. The end reaction force is applied in the case where a virtual rack end position is set on the side of a neutral position with respect to the actual rack end position at which axial movement of the rack shaft is mechanically regulated and a target steered angle that matches a target steering angle exceeds a steering angle threshold corresponding to a near-virtual rack end position that is set on the side of the neutral position with respect to the virtual rack end position. Consequently, a steering-forth operation by the driver is restricted before an end strike occurs, which suppresses the occurrence of an impact.

SUMMARY

There has been a request that the steering control device communicate the status of the steered wheels to the driver via the steering wheel in cases other than the case where an end strike occurs. The present disclosure provides a steering control device and a method for controlling a steering device that can communicate the status of steered wheels to a driver more appropriately via a steering wheel.

A first aspect of the present disclosure provides a steering control device for a steering device. The steering device is structured such that power transmission to and from a steering portion is separated from power transmission to and from a steered portion. The steered portion steers a steered wheel in accordance with a steering operation that is input to a steering wheel coupled to the steering portion. The steering control device includes an electronic control unit. The electronic control unit is configured to control operation of a steering-side motor so as to apply a steering reaction force that resists the steering operation that is input to the steering wheel. The steering-side motor is provided to the steering portion. The electronic control unit is configured to compute an obstruction strike reaction force for regulating a steering operation that steers the steered wheel toward an obstruction. The electronic control unit is configured to generate first determination information indicating that a left side of the steered wheel is struck by an obstruction and second determination information indicating that a right side of the steered wheel is struck by an obstruction. The electronic control unit is configured to set a direction in which the obstruction strike reaction force is applied based on the generated determination information.

In a situation in which the steered wheel is struck by an obstruction such as a curb, the steered wheel may be obstructed by the obstruction, and the driver may not be able to steer the steered wheel, even if the driver attempts to. In the case of the steering device that is structured such that power transmission to and from the steering portion is separated from power transmission to and from the steered portion, the situation in which the steered wheel is struck by an obstruction is not mechanically transmitted to the steering portion. In the configuration described above, in order to communicate the situation in which the steered wheel is struck by an obstruction to the driver via the steering wheel, the electronic control unit computes an obstruction strike reaction force, and sets a direction in which the obstruction strike reaction force is applied based on determination information. Specifically, the electronic control unit sets a direction in which an obstruction strike reaction force is applied to a direction that resists a further steering-forth operation toward the right side in the case where the electronic control unit generates second determination information indicating that the right side of the steered wheel is struck by an obstruction. The electronic control unit sets a direction in which an obstruction strike reaction force is applied to a direction that resists a further steering-forth operation toward the left side in the case where the electronic control unit generates first determination information indicating that the left side of the steered wheel is struck by an obstruction. Consequently, the obstruction strike reaction force for regulating a steering operation that steers the steered wheel toward the side on which the steered wheel is struck by an obstruction can be communicated to the driver via the steering wheel. Thus, the status of the steered wheel that is struck by an obstruction can be communicated to the driver via the steering wheel more appropriately.

In the steering control device described above, the electronic control unit may be configured to compute the obstruction strike reaction force based on a deviation between a steered angle of the steered wheel and a steering angle of the steering wheel.

In a situation in which the steered wheel is struck by an obstruction, there is a deviation between the steered angle of the steered wheel and the steering angle of the steering wheel. With the configuration described above, the obstruction strike reaction force that matches how the steered wheel is struck by an obstruction can be computed by computing the obstruction strike reaction force based on the deviation between the steered angle and the steering angle. Therefore, the status of the steered wheel that is struck by an obstruction can be communicated to the driver via the steering wheel further appropriately.

A second aspect of the present disclosure provides a method for controlling a steering device. The steering device is structured such that power transmission to and from a steering portion is separated from power transmission to and from a steered portion. The steered portion steers a steered wheel in accordance with a steering operation that is input to a steering wheel coupled to the steering portion. The method includes: controlling, by an electronic control unit, operation of a steering-side motor so as to apply a steering reaction force that resists the steering operation that is input to the steering wheel, the steering-side motor being provided to the steering portion; computing, by the electronic control unit, an obstruction strike reaction force for regulating a steering operation that steers the steered wheel toward an obstruction; generating, by the electronic control unit, first determination information indicating that a left side of the steered wheel is struck by an obstruction; generating, by the electronic control unit, second determination information indicating that a right side of the steered wheel is struck by an obstruction; and setting, by the electronic control unit, a direction in which the obstruction strike reaction force is applied based on the generated determination information.

With the steering control device and the method described above, the status of the steered wheel can be communicated to the driver via the steering wheel more appropriately.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
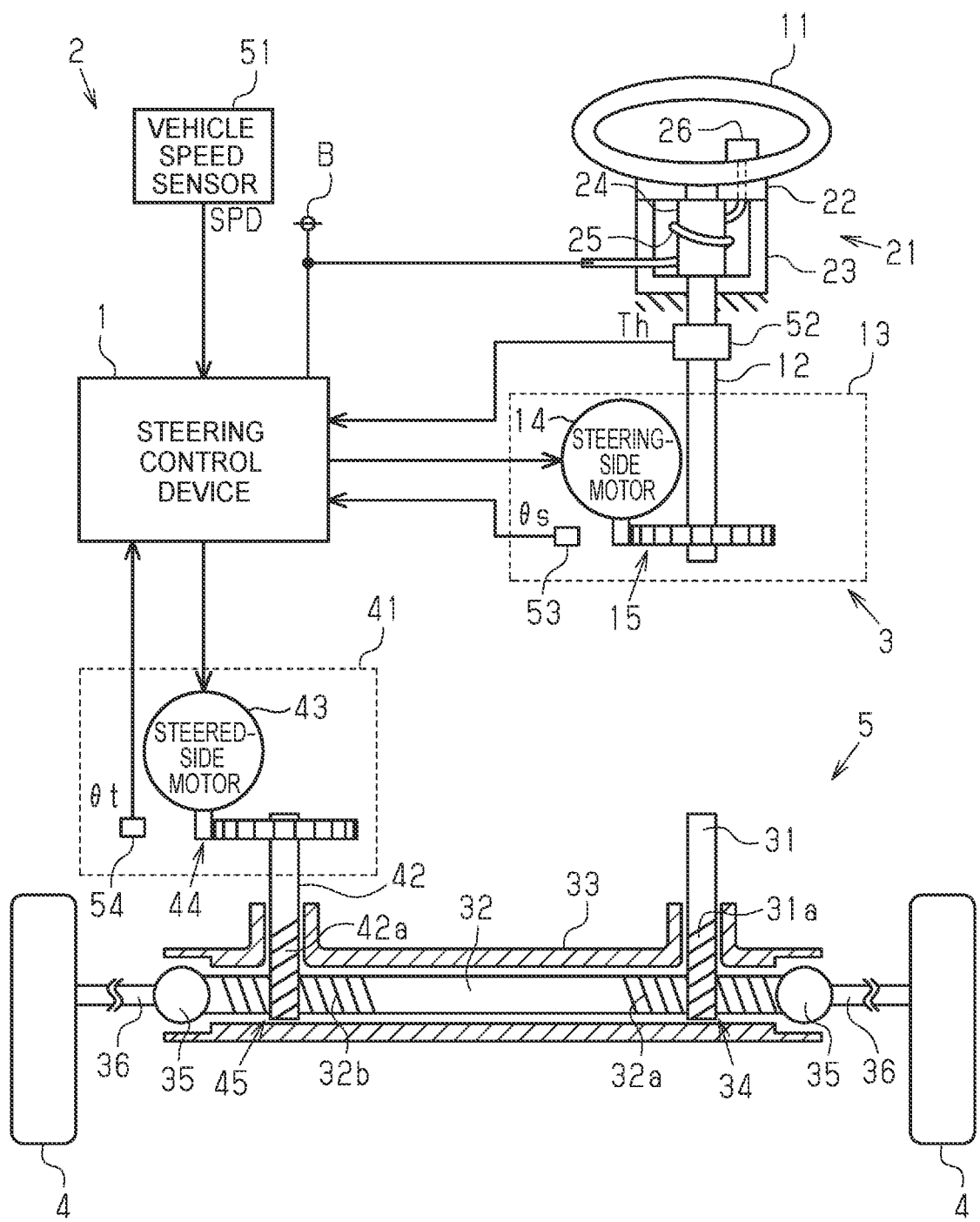
FIG. 1 illustrates a schematic configuration of a steering device of a steer-by-wire type according to an embodiment.

A steering control device according to an embodiment will be described with reference to the drawings. As illustrated in FIG. 1, a steering device 2 of a steer-by-wire type to be controlled by a steering control device 1 includes a steering portion 3 that is operated by a driver, and a steered portion 5 that steers steered wheels 4 in accordance with an operation on the steering portion 3 by the driver.

The steering portion 3 includes a steering shaft 12 to which a steering wheel 11 is fixed, and a steering-side actuator 13 that can apply a steering reaction force to the steering shaft 12. The steering-side actuator 13 includes a steering-side motor 14 that serves as a drive source, and a steering-side speed reducer 15 that transmits rotation of the steering-side motor 14 to the steering shaft 12 with the speed of the rotation reduced.

A spiral cable device 21 is coupled to the steering wheel 11. The spiral cable device 21 includes: a first housing 22 fixed to the steering wheel 11; a second housing 23 fixed to the vehicle body; a tubular member 24 fixed to the second housing 23 and housed in a space defined by the first and second housings 22 and 23; and a spiral cable 25 wound around the tubular member 24. The steering shaft 12 is inserted through the tubular member 24. The spiral cable 25 is an electrical wire that connects between a horn 26 fixed to the steering wheel 11 and an in-vehicle power source B etc. fixed to the vehicle body. The spiral cable 25 is set to be sufficiently longer than the distance between the horn 26 and the in-vehicle power source B, and supplies electric power to the horn 26 while permitting rotation of the steering wheel 11 in a range corresponding to the length of the spiral cable 25.

The steered portion 5 includes a first pinion shaft 31 that serves as a rotary shaft that enables conversion into a steered angle of the steered wheels 4, a rack shaft 32 that serves as a steered shaft coupled to the first pinion shaft 31, and a rack housing 33 that houses the rack shaft 32 so as to be reciprocally movable. The first pinion shaft 31 and the rack shaft 32 are disposed with a predetermined crossing angle. First pinion teeth 31a formed on the first pinion shaft 31 and first rack teeth 32a formed on the rack shaft 32 are meshed with each other to constitute a first rack-and-pinion mechanism 34. One end side of the rack shaft 32 in the axial direction is supported by the first rack-and-pinion mechanism 34 such that the rack shaft 32 is reciprocally movable. Tie rods 36 are coupled to respective ends of the rack shaft 32 via rack ends 35 that are ball joints. The distal ends of the tie rods 36 are coupled to knuckles (not illustrated) to which the steered wheels 4 are assembled.

The steered portion 5 is provided with a steered-side actuator 41 that applies a steering force for steering the steered wheels 4 to the rack shaft 32 via a second pinion shaft 42. The steered-side actuator 41 includes a steered-side motor 43 that serves as a drive source, and a steered-side speed reducer 44 that transmits rotation of the steered-side motor 43 to the second pinion shaft 42 with the speed of the rotation reduced. The second pinion shaft 42 and the rack shaft 32 are disposed with a predetermined crossing angle. Second pinion teeth 42a formed on the second pinion shaft 42 and second rack teeth 32b formed on the rack shaft 32 are meshed with each other to constitute a second rack-and-pinion mechanism 45. The other end side of the rack shaft 32 in the axial direction is supported by the second rack-and-pinion mechanism 45 so as to be reciprocally movable.

In the thus configured steering device 2, the second pinion shaft 42 is rotationally driven by the steered-side actuator 41 in accordance with a steering operation by the driver, and rotation of the second pinion shaft 42 is converted into axial movement of the rack shaft 32 by the second rack-and-pinion mechanism 45 to change the steered angle of the steered wheels 4. At this time, a steering reaction force that resists the steering operation by the driver is applied from the steering-side actuator 13 to the steering wheel 11.

The electrical configuration of the present embodiment will be described. The steering control device 1 is connected to the steering-side motor 14 and the steered-side motor 43 to control operation of the steering-side motor 14 and the steered-side motor 43. The steering control device 1 is constituted by an electronic control unit that includes a central processing unit (CPU) and a memory (not illustrated), and various types of control are executed with the CPU executing a program stored in the memory in predetermined computation cycles.

A vehicle speed sensor 51 that detects a vehicle speed SPD of the vehicle and a torque sensor 52 that detects steering torque Th applied to the steering shaft 12 are connected to the steering control device 1. The torque sensor 52 is provided on the steering shaft 12 on the steering wheel 11 side with respect to a portion at which the steering shaft 12 is coupled to the steering-side speed reducer 15. A steering-side rotation sensor 53 that detects a rotational angle θs of the steering-side motor 14 as a detection value that indicates the steering amount of the steering portion 3 as a relative angle in the range of 360 degrees and a steered-side rotation sensor 54 that detects a rotational angle θt of the steered-side motor 43 as a detection value that indicates the steered amount of the steered portion 5 as a relative angle are also connected to the steering control device 1. The steering torque Th and the rotational angles θs and θt are each detected as a positive value in the case where the vehicle is steered in the right direction, and as a negative value in the case where the vehicle is steered in the left direction. The steering control device 1 controls operation of the steering-side motor 14 and the steered-side motor 43 based on such various state amounts.

Figure 2:
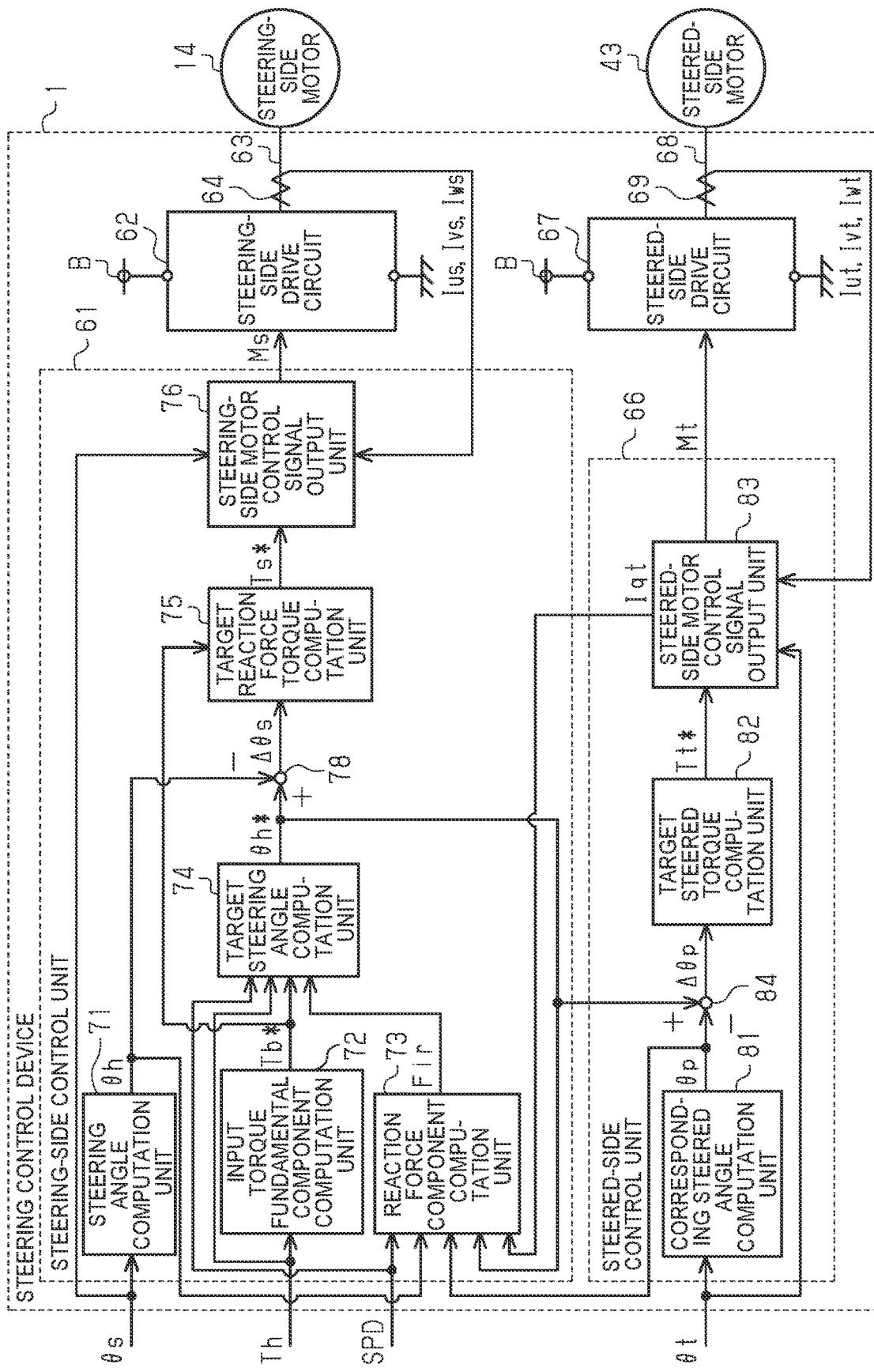
FIG. 2 is a block diagram of a steering control device according to the embodiment.

The configuration of the steering control device 1 will be described. As illustrated in FIG. 2, the steering control device 1 includes a steering-side control unit 61 that outputs a steering-side motor control signal Ms, and a steering-side drive circuit 62 that supplies drive electric power to the steering-side motor 14 based on the steering-side motor control signal Ms. Current sensors 64 that detect phase current values Ius, Ivs, and Iws of the steering-side motor 14 that flow through connection lines 63 between the steering-side drive circuit 62 and motor coils of the steering-side motor 14 for respective phases are connected to the steering-side control unit 61. In FIG. 2, for convenience of illustration, the connection lines 63 for the respective phases and the current sensors 64 for the respective phases are illustrated collectively.

The steering control device 1 also includes a steered-side control unit 66 that outputs a steered-side motor control signal Mt, and a steered-side drive circuit 67 that supplies drive electric power to the steered-side motor 43 based on the steered-side motor control signal Mt. Current sensors 69 that detect phase current values Iut, Ivt, and Iwt of the steered-side motor 43 that flow through connection lines 68 between the steered-side drive circuit 67 and motor coils of the steered-side motor 43 for respective phases are connected to the steered-side control unit 66. In FIG. 2, for convenience of illustration, the connection lines 68 for the respective phases and the current sensors 69 for the respective phases are illustrated collectively. The steering-side drive circuit 62 and the steered-side drive circuit 67 according to the present embodiment each adopt a well-known PWM inverter that has a plurality of switching elements. Field effect transistors (FETs) etc. are adopted as the switching elements. The steering-side motor control signal Ms and the steered-side motor control signal Mt are each a gate on and off signal that prescribes the on and off state of each of the switching elements.

The steering control device 1 generates the steering-side motor control signal Ms and the steered-side motor control signal Mt by executing various computation processes indicated by the following various control blocks in predetermined computation cycles. When the steering-side motor control signal Ms and the steered-side motor control signal Mt are output to the steering-side drive circuit 62 and the steered-side drive circuit 67, respectively, the switching elements are turned on and off such that drive electric power is supplied from the in-vehicle power source B to the steering-side motor 14 and the steered-side motor 43. Consequently, operation of the steering-side actuator 13 and the steered-side actuator 41 is controlled.

The configuration of the steering-side control unit 61 will be described. The steering-side control unit 61 receives, as inputs, the vehicle speed SPD, the steering torque Th, the rotational angle θs, the phase current values Ius, Ivs, and Iws, a corresponding steered angle θp output from the steered-side control unit 66, to be described later, and a q-axis current value Iqt that is a drive current for the steered-side motor 43. The steering-side control unit 61 generates the steering-side motor control signal Ms based on such state amounts, and outputs the generated signal.

Specifically, the steering-side control unit 61 includes a steering angle computation unit 71 that computes a steering angle θh of the steering wheel 11 based on the rotational angle θs of the steering-side motor 14. The steering-side control unit 61 also includes an input torque fundamental component computation unit 72 that computes an input torque fundamental component Tb* that is a force that rotates the steering wheel 11, and a reaction force component computation unit 73 that computes a reaction force component Fir that is a force that resists rotation of the steering wheel 11. The steering-side control unit 61 also includes a target steering angle computation unit 74 that computes a target steering angle θh* based on the steering torque Th, the vehicle speed SPD, the input torque fundamental component Tb*, and the reaction force component Fir. The steering-side control unit 61 also includes a target reaction force torque computation unit 75 that computes target reaction force torque Ts* based on the steering angle θh and the target steering angle θh*, and a steering-side motor control signal output unit 76 that outputs the steering-side motor control signal Ms based on the target reaction force torque Ts*.

The steering angle computation unit 71 acquires the input rotational angle θs as converted into an absolute angle including a range exceeding 360 degrees by counting the number of rotations of the steering-side motor 14 from the steering neutral position, for example. The steering angle computation unit 71 computes the steering angle θh by multiplying the rotational angle, which has been converted into an absolute angle, by a conversion coefficient Ks based on the rotational speed ratio of the steering-side speed reducer 15. The thus computed steering angle θh is output to a subtractor 78 and the reaction force component computation unit 73.

The input torque fundamental component computation unit 72 receives the steering torque Th as an input. The input torque fundamental component computation unit 72 computes the input torque fundamental component Tb* that has a larger absolute value as the absolute value of the steering torque Th is larger. The thus computed input torque fundamental component Tb* is input to the target steering angle computation unit 74 and the target reaction force torque computation unit 75.

The target steering angle computation unit 74 receives, as an input, the reaction force component Fir that is computed by the reaction force component computation unit 73 (to be described later) in addition to the steering torque Th, the vehicle speed SPD, and the input torque fundamental component Tb*. The target steering angle computation unit 74 computes the target steering angle $\theta h^*$ utilizing the following model formula (1) that correlates input torque Tin*, which is a value obtained by adding the steering torque Th to the input torque fundamental component Tb* and subtracting the reaction force component Fir therefrom, and the target steering angle $\theta h^*$.

$$Tin^* = C \cdot \theta h^{*\prime} + J \cdot \theta h^{*\prime\prime} \tag{1}$$

The model formula defines and represents the relationship between torque and the rotational angle of a rotary shaft that is rotated along with rotation of the steering wheel 11 in a system in which the steering wheel and the steered wheels 4, that is, the steering portion 3 and the steered portion 5, are mechanically coupled to each other. The model formula is represented using a viscosity coefficient C obtained by modeling the friction etc. of the steering device 2 and an inertia coefficient J obtained by modeling the inertia of the steering device 2. The viscosity coefficient C and the inertia coefficient J are set so as to be variable in accordance with the vehicle speed SPD. The target steering angle $\theta h^*$ that is computed using the model formula in this manner is output to the reaction force component computation unit 73 in addition to the subtractor 78 and the steered-side control unit 66.

The target reaction force torque computation unit 75 receives, as an input, an angle deviation $\Delta \theta s$ obtained by the subtractor 78 subtracting the steering angle $\theta h$ from the target steering angle $\theta h^*$, in addition to the input torque fundamental component Tb*. The target reaction force torque computation unit 75 computes fundamental reaction force torque, which is the base of a steering reaction force applied by the steering-side motor 14 as a control amount for performing feedback control so as to bring the steering angle $\theta h$ to the target steering angle $\theta h^*$, based on the angle deviation $\Delta \theta s$, and computes the target reaction force torque Ts* by adding the input torque fundamental component Tb* to the fundamental reaction force torque. Specifically, the target reaction force torque computation unit 75 computes the fundamental reaction force torque as the sum of respective output values from a proportional element, an integral element, and a differential element that receive the angle deviation $\Delta \theta s$ as an input.

The steering-side motor control signal output unit 76 receives, as inputs, the rotational angle $\theta s$ and the phase current values Ius, Ivs, and Iws in addition to the target reaction force torque Ts*. The steering-side motor control signal output unit 76 according to the present embodiment computes a steering-side q-axis target current value Iqs* on the q-axis in the dq coordinate system based on the target reaction force torque Ts*. In the present embodiment, a steering-side d-axis target current value Ids* on the d-axis is basically set to zero. The steering-side motor control signal output unit 76 generates the steering-side motor control signal Ms to be output to the steering-side drive circuit 62 by executing current feedback control in the dq coordinate system.

Specifically, the steering-side motor control signal output unit 76 computes a d-axis current value Ids and a q-axis current value Iqs, which are actual current values of the steering-side motor 14 in the dq coordinate system, by mapping the phase current values Ius, Ivs, and Iws onto the dq coordinate based on the rotational angle $\theta s$. The steering-side motor control signal output unit 76 computes a target voltage value based on current deviations on the d-axis and the q-axis, and generates the steering-side motor control signal Ms that has a duty ratio based on the target voltage value, in order to cause the d-axis current value Ids to follow the steering-side d-axis target current value Ids* and cause the q-axis current value Iqs to follow the steering-side q-axis target current value Iqs*. With the thus computed steering-side motor control signal Ms output to the steering-side drive circuit 62, drive electric power that matches the steering-side motor control signal Ms is output to the steering-side motor 14 to control operation thereof.

The steered-side control unit 66 will be described. The steered-side control unit 66 receives, as inputs, the rotational angle $\theta t$, the target steering angle $\theta h^*$, and the phase current values Iut, Ivt, and Iwt of the steered-side motor 43. The steered-side control unit 66 generates the steered-side motor control signal Mt based on such state amounts, and outputs the generated signal.

Specifically, the steered-side control unit 66 includes a corresponding steered angle computation unit 81 that computes the corresponding steered angle $\theta p$ corresponding to a pinion angle that is the rotational angle of the first pinion shaft 31. The steered-side control unit 66 includes a target steered torque computation unit 82 that computes target steered torque Tt* based on the corresponding steered angle $\theta p$ and the target steering angle $\theta h^*$, and a steered-side motor control signal output unit 83 that generates the steered-side motor control signal Mt based on the target steered torque Tt*. In the steering device 2 according to the present embodiment, the steering angle ratio, which is the ratio between the steering angle $\theta h$ and the corresponding steered angle $\theta p$, is set to be constant, and a target corresponding steered angle is set to be equal to the target steering angle $\theta h^*$. In this case, the steering angle $\theta h$ and the corresponding steered angle $\theta p$ make a one-to-one correspondence.

The corresponding steered angle computation unit 81 acquires the input rotational angle $\theta t$ as converted into an absolute angle by counting the number of rotations of the steered-side motor 43 from the neutral position at which the vehicle travels straight, for example. The corresponding steered angle computation unit 81 computes the corresponding steered angle $\theta p$ by multiplying the rotational angle, which has been converted into an absolute angle, by a conversion coefficient Kt based on the rotational speed ratio of the steered-side speed reducer 44 and the rotational speed ratio of the first and second rack-and-pinion mechanisms 34 and 45. That is, the corresponding steered angle $\theta p$ corresponds to the steering angle $\theta h$ of the steering wheel 11 for a case where it is assumed that the first pinion shaft 31 is coupled to the steering shaft 12. The thus computed corresponding steered angle $\theta p$ is output to a subtractor 84 and the reaction force component computation unit 73. The subtractor 84 receives, as an input, the target steering angle $\theta h^*$ in addition to the corresponding steered angle $\theta p$. The target steering angle $\theta h^*$ is a target corresponding steered angle that is a target value for the corresponding steered angle $\theta p$.

The target steered torque computation unit 82 receives, as an input, an angle deviation $\Delta \theta p$ obtained by the subtractor 84 subtracting the corresponding steered angle $\theta p$ from the target steering angle $\theta h^*$. The target steered torque computation unit 82 computes the target steered torque Tt*, which is a target value for a steering force applied by the steered-side motor 43, as a control amount for performing feedback control so as to bring the corresponding steered angle $\theta p$ to the target steering angle $\theta h^*$, based on the angle deviation $\Delta\theta p$. Specifically, the target steered torque computation unit 82 computes the target steered torque $Tt^*$ as the sum of respective output values from a proportional element, an integral element, and a differential element that receive the angle deviation $\Delta\theta p$ as an input.

The steered-side motor control signal output unit 83 receives, as inputs, the rotational angle $\theta t$ and the phase current values Jut, Ivt, and Iwt in addition to the target steered torque $Tt^*$. The steered-side motor control signal output unit 83 computes a steered-side q-axis target current value $Iqt^*$ on the q-axis in the dq coordinate system based on the target steered torque $Tt^*$. The steered-side motor control signal output unit 83 restricts the absolute value of the steered-side q-axis target current value $Iqt^*$ to a predetermined restriction value Ilim or less based on the drive state of the steered-side motor 43. The predetermined restriction value Ilim is a value that is smaller than a rated current Ir set in advance as the maximum value of a drive current that can be supplied to the steered-side motor 43 and that enables the steered wheels 4 to be steered smoothly if the steered wheels 4 are not struck by an obstruction such as a curb, and has been set in advance based on an experiment etc. In the present embodiment, a steered-side d-axis target current value $Idt^*$ on the d-axis is basically set to zero. The steered-side motor control signal output unit 83 generates the steered-side motor control signal Mt to be output to the steered-side drive circuit 67 by executing current feedback control in the dq coordinate system.

Figure 3:
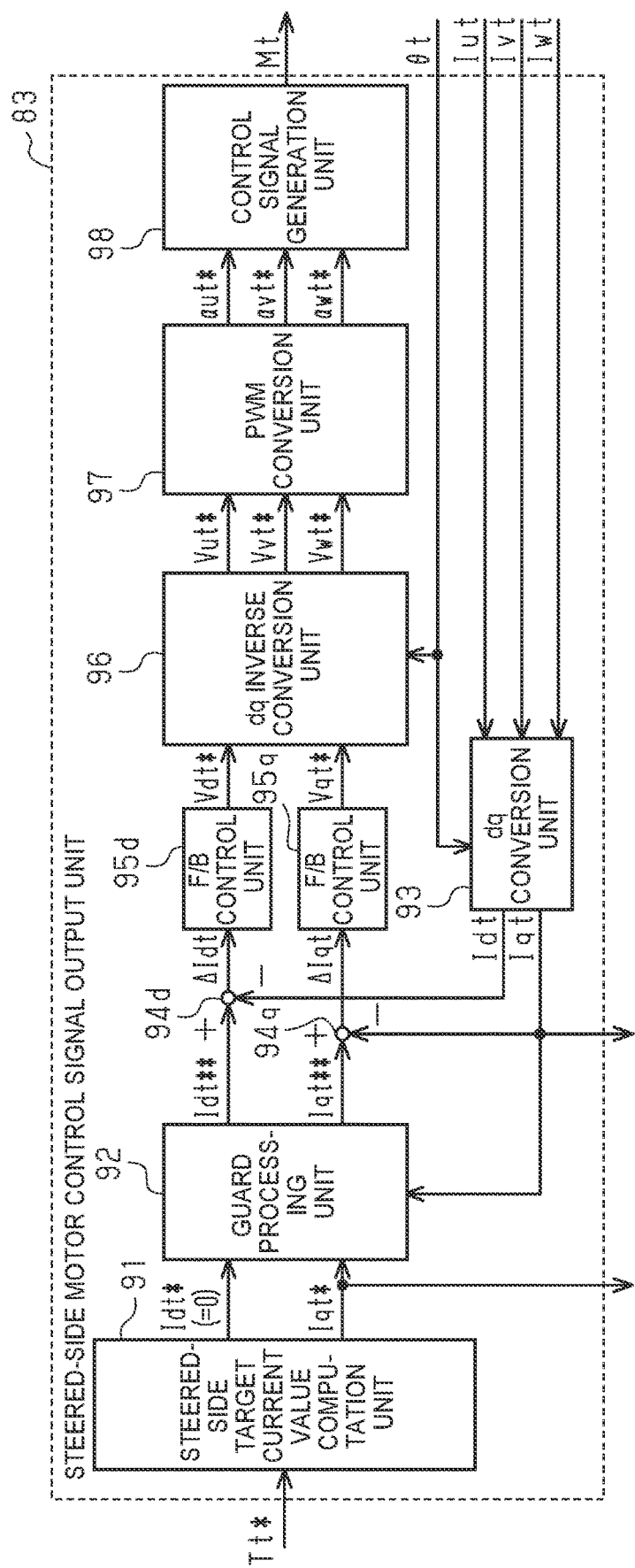
FIG. 3 is a block diagram of a steered-side motor control signal output unit according to the embodiment.

The steered-side motor control signal output unit 83 will be described. As illustrated in FIG. 3, the steered-side motor control signal output unit 83 includes a steered-side target current value computation unit 91 that computes the steered-side d-axis target current value $Idt^*$ and the steered-side q-axis target current value $Iqt^*$, and a guard processing unit 92 that restricts the absolute values of the steered-side d-axis target current value $Idt^*$ and the steered-side q-axis target current value $Iqt^*$ to be small.

The steered-side target current value computation unit 91 receives the target steered torque $Tt^*$ as an input. The steered-side target current value computation unit 91 computes the steered-side q-axis target current value $Iqt^*$ based on the target steered torque $Tt^*$. Specifically, the steered-side target current value computation unit 91 computes the steered-side q-axis target current value $Iqt^*$ having absolute value that becomes larger as the absolute value of the target steered torque $Tt^*$ is increased. The thus computed steered-side q-axis target current value $Iqt^*$ is output to the guard processing unit 92 and the reaction force component computation unit 73. The steered-side target current value computation unit 91 also outputs the steered-side d-axis target current value $Idt^*$, which indicates zero, to the guard processing unit 92.

The guard processing unit 92 receives, as inputs, the steered-side d-axis target current value $Idt^*$, the steered-side q-axis target current value $Iqt^*$, and a d-axis current value Idt and the q-axis current value Iqt that are output from a dq conversion unit 93 to be described later. The guard processing unit 92 restricts the absolute value of the steered-side q-axis target current value $Iqt^*$ to the predetermined restriction value Ilim or less based on the q-axis current value Iqt that is a value that indicates the drive state of the steered-side motor 43. When a guard process is performed, a restricted steered-side q-axis target current value $Iqt^{**}$ after being restricted is equal to the steered-side q-axis target current value $Iqt^*$ in the case where the absolute value of the steered-side q-axis target current value $Iqt^*$ is equal to or less than the predetermined restriction value Ilim. In the case where the absolute value of the steered-side q-axis target current value $Iqt^*$ is more than the predetermined restriction value Ilim, meanwhile, the absolute value of the restricted steered-side q-axis target current value $Iqt^{**}$ is equal to the predetermined restriction value Ilim. Since the steered-side d-axis target current value $Idt^*$ is zero, the guard processing unit 92 outputs the steered-side d-axis target current value $Idt^*$, as it is, as a restricted steered-side d-axis target current value $Idt^{**}$.

As illustrated in FIG. 3, the phase current values Iut, Ivt, and Iwt that are input to the steered-side motor control signal output unit 83 are input to the dq conversion unit 93. The dq conversion unit 93 computes the d-axis current value Idt and the q-axis current value Iqt by mapping the phase current values Iut, Ivt, and Iwt onto the dq coordinate based on the rotational angle $\theta t$. The d-axis current value Idt is input to a subtractor 94$d$ together with the restricted steered-side d-axis target current value $Idt^{}$. The q-axis current value Iqt is input to a subtractor 94$q$ together with the restricted steered-side q-axis target current value $Iqt^{}$. The subtractors 94$d$ and 94$q$ compute a d-axis current deviation $\Delta Idt$ and a q-axis current deviation $\Delta Iqt$, respectively. The q-axis current value Iqt is also output to the reaction force component computation unit 73.

The d-axis current deviation $\Delta Idt$ and the q-axis current deviation $\Delta Iqt$ are input to corresponding feedback (F/B) control units 95$d$ and 95$q$. The F/B control units 95$d$ and 95$q$ compute a d-axis target voltage value $Vdt^*$ and a q-axis target voltage value $Vqt^*$ by multiplying the d-axis current deviation $\Delta Idt$ and the q-axis current deviation $\Delta Iqt$ by a predetermined gain, in order to cause the restricted steered-side d-axis target current value $Idt^{}$ and the restricted steered-side q-axis target current value $Iqt^{}$ to follow the d-axis current value Idt and the q-axis current value Iqt, respectively.

The d-axis target voltage value $Vdt^*$ and the q-axis target voltage value $Vqt^*$ are input to a dq inverse conversion unit 96 together with the rotational angle $\theta t$. The dq inverse conversion unit 96 computes target voltage values $Vut^*$, $Vvt^*$, and $Vwt^*$ for three phases by mapping the d-axis target voltage value $Vdt^*$ and the q-axis target voltage value $Vqt^*$ onto the AC coordinate for the three phases based on the rotational angle $\theta t$. Subsequently, the target voltage values $Vut^*$, $Vvt^*$, and $Vwt^*$ are input to a PWM conversion unit 97. The PWM conversion unit 97 computes duty command values $\alpha ut^*$, $\alpha vt^*$, and $\alpha wt^*$ based on the target voltage values $Vut^*$, $Vvt^*$, and $Vwt^*$, and outputs the computed values to a control signal generation unit 98. The control signal generation unit 98 generates the steered-side motor control signal Mt that has duty ratios indicated by the duty command values $\alpha ut^*$, $\alpha vt^*$, and $\alpha wt^*$ through a comparison between the duty command values $\alpha ut^*$, $\alpha vt^*$, and $\alpha wt^*$ and a PWM carrier as a carrier wave such as a triangular wave or a sawtooth wave, and outputs the generated signal to the steered-side drive circuit 67. Consequently, as illustrated in FIG. 2, drive electric power that matches the steered-side motor control signal Mt is output to the steered-side motor 43 to control operation thereof.

The configuration of the reaction force component computation unit 73 will be described. The reaction force component computation unit 73 receives the vehicle speed SPD, the steering angle $\theta h$, the corresponding steered angle $\theta p$, the target steering angle $\theta h^*$, and the q-axis current value Iqt as inputs. The reaction force component computation unit 73 computes the reaction force component Fir based on such state amounts, and outputs the computed reaction force component Fir to the target steering angle computation unit 74.

Figure 4:
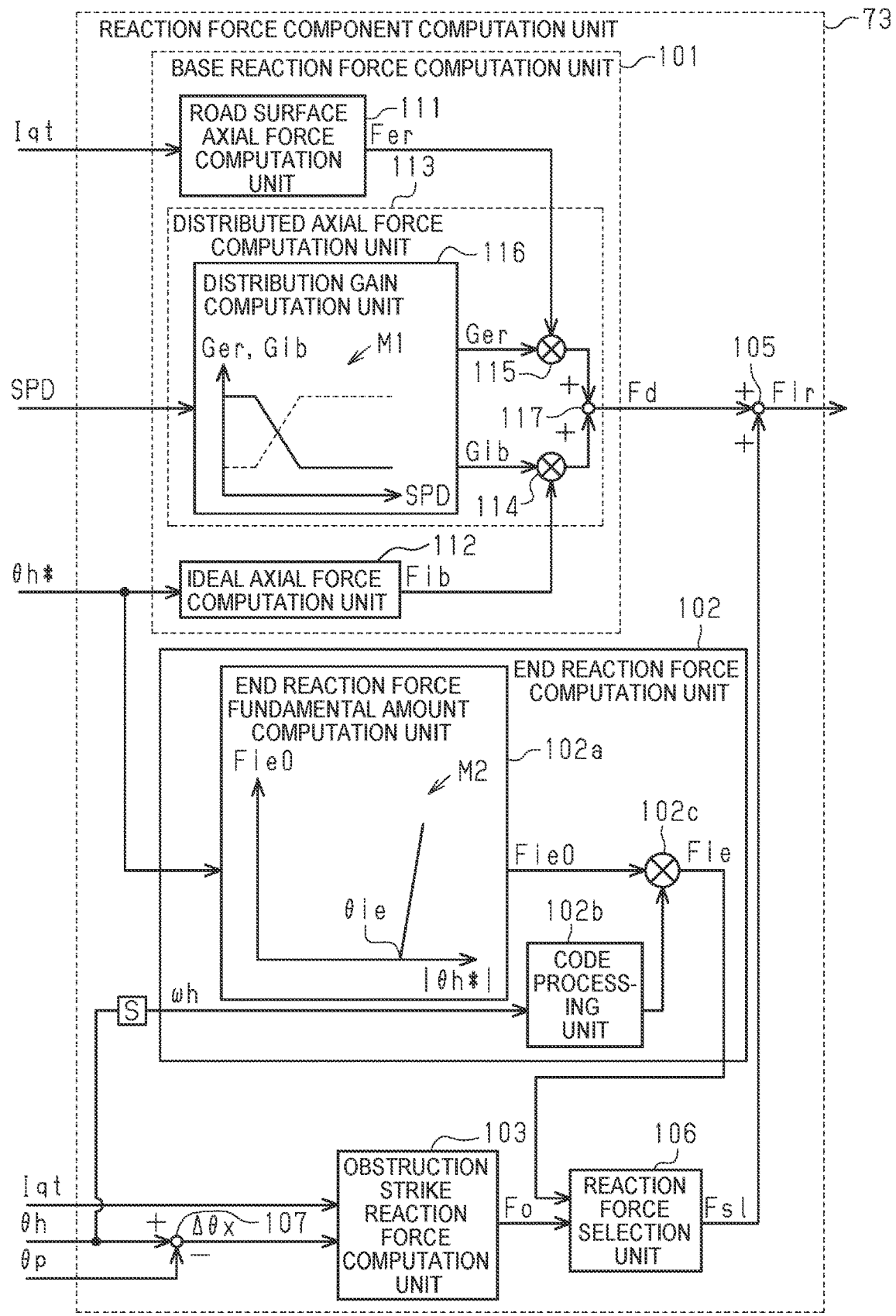
FIG. 4 is a block diagram of a reaction force component computation unit according to the embodiment.

As illustrated in FIG. 4, the reaction force component computation unit 73 includes a base reaction force computation unit 101, an end reaction force computation unit 102, and an obstruction strike reaction force computation unit 103. The base reaction force computation unit 101 computes a base reaction force Fd that matches the axial force of the rack shaft 32. The end reaction force computation unit 102 computes an end reaction force Fie that is a reaction force that resists a further steering-forth operation in the case where the absolute value of the steering angle θh of the steering wheel 11 is brought closer to a limit steering angle. The obstruction strike reaction force computation unit 103 computes an obstruction strike reaction force Fo that resists a further steering-forth operation toward an obstruction such as a curb in the case where the steered wheel 4 is steered to be struck by the obstruction. The reaction force component computation unit 73 outputs, as the reaction force component Fir, a value obtained by adding the end reaction force Fie or the obstruction strike reaction force Fo, whichever has a larger absolute value, to the base reaction force Fd.

More specifically, the base reaction force computation unit 101 includes a road surface axial force computation unit 111 that computes a road surface axial force Fer, and an ideal axial force computation unit 112 that computes an ideal axial force Fib. The road surface axial force Fer and the ideal axial force Fib are computed in the dimension (N·m) of torque. The reaction force component computation unit 73 also includes a distributed axial force computation unit 113 that computes, as the base reaction force Fd, a distributed axial force obtained by distributing the ideal axial force Fib and the road surface axial force Fer at predetermined proportions such that an axial force applied from the road surface to the steered wheels 4, that is, road surface information transmitted from the road surface, is reflected.

The ideal axial force computation unit 112 receives the target steering angle θh* as an input. The ideal axial force computation unit 112 computes the ideal axial force Fib, which is an ideal value of the axial force that acts on the steered wheels 4 and in which the road surface information is not reflected, based on the target steering angle θh*. The axial force that acts on the steered wheels 4 corresponds to a force transmitted to the steered wheels 4. Specifically, the ideal axial force computation unit 112 computes the ideal axial force Fib such that the absolute value thereof becomes larger as the absolute value of the target steering angle θh* becomes larger. The thus computed ideal axial force Fib is output to a multiplier 114.

The road surface axial force computation unit 111 receives the q-axis current value Iqt of the steered-side motor 43 as an input. The road surface axial force computation unit 111 computes the road surface axial force Fer, which is an estimated value of the axial force that acts on the steered wheels 4 and in which the road surface information is reflected, based on the q-axis current value Iqt. Specifically, the road surface axial force computation unit 111 computes the road surface axial force Fer such that the absolute value thereof becomes larger as the absolute value of the q-axis current value Iqt becomes larger on the assumption that torque applied to the rack shaft 32 by the steered-side motor 43 and torque that matches a force applied from the road surface to the steered wheels 4 are balanced with each other. The thus computed road surface axial force Fer is output to a multiplier 115.

The distributed axial force computation unit 113 receives, as inputs, the road surface axial force Fer and the ideal axial force Fib in addition to the vehicle speed SPD. The distributed axial force computation unit 113 includes a distribution gain computation unit 116 that computes distribution gains Gib and Ger, which are respective distribution proportions for distributing the ideal axial force Fib and the road surface axial force Fer, based on the vehicle speed SPD. The distribution gain computation unit 116 according to the present embodiment includes a map M1 that defines the relationship between the vehicle speed SPD and the distribution gains Gib and Ger. The distribution gain computation unit 116 computes the distribution gains Gib and Ger that match the vehicle speed SPD by referencing the map M1. As indicated by the continuous line, the distribution gain Gib has a smaller value in the case where the vehicle speed SPD is higher than in the case where the vehicle speed SPD is lower. As indicated by the dashed line, meanwhile, the distribution gain Ger has a larger value in the case where the vehicle speed SPD is higher than in the case where the vehicle speed SPD is lower. In the present embodiment, the values of the distribution gains Gib and Ger are set such that the sum thereof is "1". The thus computed distribution gain Gib is output to the multiplier 114. The distribution gain Ger is output to the multiplier 115.

The distributed axial force computation unit 113 computes the base reaction force Fd by the multiplier 114 multiplying the ideal axial force Fib by the distribution gain Gib, the multiplier 115 multiplying the road surface axial force Fer by the distribution gain Ger, and an adder 117 adding such values. The base reaction force Fd corresponds to a distributed axial force obtained by distributing the ideal axial force Fib and the road surface axial force Fer at predetermined proportions. The thus computed base reaction force Fd is output to an adder 105.

The end reaction force computation unit 102 receives, as an input, the target steering angle θh* and a steering speed ωh obtained by differentiating the steering angle θh. The end reaction force computation unit 102 includes an end reaction force fundamental amount computation unit 102a, a code processing unit 102b, and a multiplier 102c. The end reaction force fundamental amount computation unit 102a receives the target steering angle θh* as an input. The end reaction force fundamental amount computation unit 102a includes a map M2 that defines the relationship between the target steering angle θh* and an end reaction force fundamental amount Fie0. The end reaction force fundamental amount computation unit 102a computes the end reaction force fundamental amount Fie0 that matches the absolute value of the target steering angle θh* by referencing the map M2. A threshold angle θie is set in the map M2. The end reaction force fundamental amount computation unit 102a computes the end reaction force fundamental amount Fie0 as zero in the case where the absolute value of the target steering angle θh* is equal to or less than the threshold angle θie, and computes the end reaction force fundamental amount Fie0 as having an absolute value that is more than zero in the case where the absolute value of the target steering angle θh* is more than the threshold angle θie. The thus computed end reaction force fundamental amount Fie0 is output to the multiplier 102c. The code processing unit 102b receives the steering speed ωh as an input. The code processing unit 102b outputs the sign of the steering speed ωh to the multiplier 102c. That is, the code processing unit 102b outputs, to the multiplier 102c, "+1" in the case where the steering speed ωh is positive, "−1" in the case where the steering speed ωh is negative, and "0" in the case where the steering speed ωh is zero. The multiplier 102c receives, as inputs, the end reaction force fundamental amount Fie0 and the sign that is selected by the code processing unit 102b. The multiplier 102c computes the end reaction force Fie by multiplying one of "+1", "−1", and "0" and the end reaction force fundamental amount Fie0. The thus computed end reaction force Fie is output to a reaction force selection unit 106. The absolute value of the end reaction force Fie is set to such a large value that any further steering-forth operation cannot be performed with human power when the target steering angle θh* is larger than the threshold angle θie by a certain degree.

In the present embodiment, in the relationship with the mechanical configuration of the steered portion 5, a virtual rack end position is set on the neutral position side with respect to a mechanical rack end position at which axial movement of the rack shaft 32 is regulated with the rack end 35 abutting against the rack housing 33. The threshold angle θie is set to the value of the corresponding steered angle θp at a near-virtual rack end position positioned further on the neutral position side by a predetermined angle with respect to the virtual rack end position. The threshold angle θie, or in other words the corresponding steered angle θp at the near-virtual rack end position, is set on the neutral position side with respect to the steering angle θh at the maximum steering end position of the steering wheel 11 permitted by the spiral cable device 21 in the relationship with the mechanical configuration of the steering portion 3 under the assumption that the steering portion 3 and the steered portion 5 are coupled to each other. That is, in the steering device 2 according to the present embodiment, the near-virtual rack end position is set as the limit steering position of the steered portion 5, and the steering end position is set as the limit steering position of the steering portion 3. Under the assumption that the first pinion shaft 31 is coupled to the steering shaft 12, the steered wheel 4 of the steered portion 5 reaches the limit steering position earlier. The threshold angle θie corresponds to a steering angle threshold set in accordance with the steering device 2.

The obstruction strike reaction force computation unit 103 receives, as an input, an angle deviation Δθx, which is obtained by a subtractor 107 subtracting the corresponding steered angle θp from the steering angle θh, in addition to the q-axis current value Iqt. The obstruction strike reaction force computation unit 103 according to the present embodiment computes the obstruction strike reaction force Fo based on the q-axis current value Iqt and the angle deviation Δθx.

Figure 5:
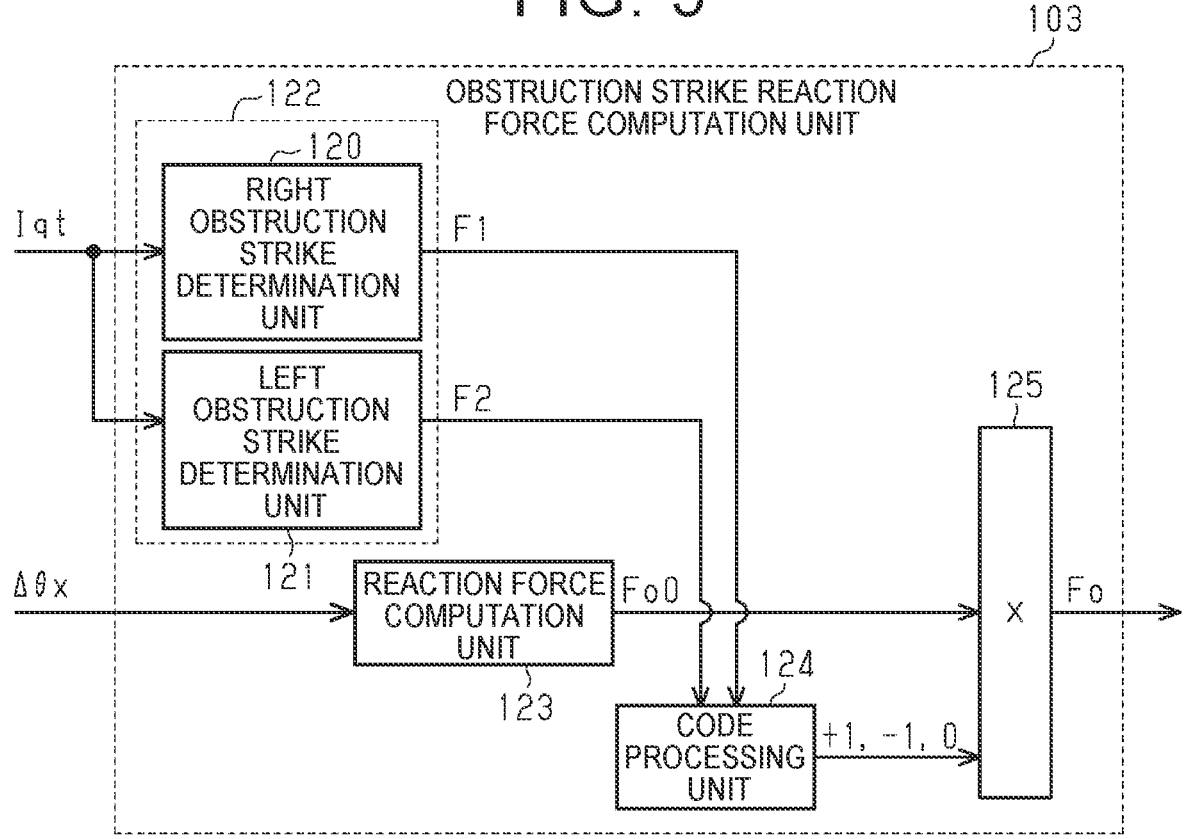
FIG. 5 is a block diagram of an obstruction strike reaction force computation unit according to the embodiment.

The configuration of the obstruction strike reaction force computation unit 103 will be described. As illustrated in FIG. 5, the obstruction strike reaction force computation unit 103 includes a right obstruction strike determination unit 120, a left obstruction strike determination unit 121, a reaction force computation unit 123, a code processing unit 124, and a multiplier 125. The right obstruction strike determination unit 120 and the left obstruction strike determination unit 121 constitute an obstruction strike determination unit 122.

The right obstruction strike determination unit 120 receives the q-axis current value Iqt as an input. The right obstruction strike determination unit 120 determines that the right side of the steered wheel 4 is struck by an obstruction in the case where the q-axis current value Iqt is equal to or more than a first current threshold that is a positive threshold, and generates a first flag F1 as information that indicates the determination result. On the other hand, the right obstruction strike determination unit 120 determines that the right side of the steered wheel 4 is not struck by an obstruction in the case where the q-axis current value Iqt is less than the first current threshold, and does not generates the first flag F1. The first current threshold is set based on a current that flows since the right side of the steered wheel 4 is struck by an obstruction before the steering wheel 11 reaches a steering limit. In the case where the steered wheel 4 is struck by an obstruction, the deviation between the target steering angle θh* and the corresponding steered angle θp cannot be eliminated even if the q-axis current value Iqt as a drive current flows through the steered-side motor 43 in order to eliminate the angle deviation Δθp that is the deviation between the target steering angle θh* and the corresponding steered angle θp. Since the angle deviation Δθp cannot be eliminated even if the q-axis current value Iqt flows, the steering control device 1 further increases the absolute value of the q-axis current value Iqt of the current that flows through the steered-side motor 43 compared to the present value. As a result, the q-axis current value Iqt is equal to or more than the first current threshold in the case where the right side of the steered wheel 4 is struck by an obstruction. The thus generated first flag F1 is output to the code processing unit 124. The first flag F1 is an example of the second determination information.

The left obstruction strike determination unit 121 receives the q-axis current value Iqt as an input. The left obstruction strike determination unit 121 determines that the left side of the steered wheel 4 is struck by an obstruction in the case where the q-axis current value Iqt is equal to or less than a second current threshold that is a negative threshold, and generates a second flag F2 as information that indicates the determination result. On the other hand, the left obstruction strike determination unit 121 determines that the left side of the steered wheel 4 is not struck by an obstruction in the case where the q-axis current value Iqt is more than the second current threshold, and does not generates the second flag F2. The second current threshold is set based on a current that flows since the left side of the steered wheel 4 is struck by an obstruction before the steering wheel 11 reaches a steering limit on the left side. The thus generated second flag F2 is output to the code processing unit 124.

The reaction force computation unit 123 receives the angle deviation Δθx as an input. The reaction force computation unit 123 stores a map M3 illustrated in FIG. 6. The map M3 is a map that defines the relationship between the absolute value of the angle deviation Δθx and an obstruction strike reaction force fundamental amount Fo0. The reaction force computation unit 123 computes the obstruction strike reaction force fundamental amount Fo0 that matches the angle deviation Δθx by referencing the map M3.

Figure 6:
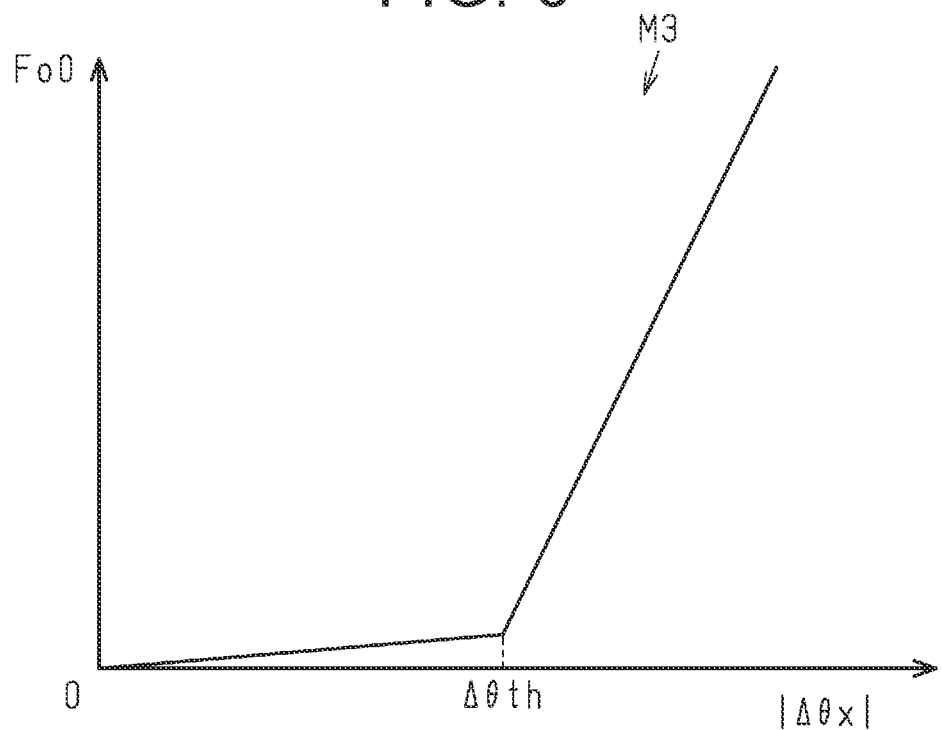
FIG. 6 is a graph indicating the relationship between an angle deviation and an obstruction strike reaction force fundamental amount.

FIG. 6 illustrates the map M3. In the map M3, the obstruction strike reaction force fundamental amount Fo0 is "0" in the case where the angle deviation Δθx is zero, and the obstruction strike reaction force fundamental amount Fo0 is gently increased in proportion to an increase in the absolute value of the angle deviation Δθx. When the absolute value of the angle deviation Δθx is larger than an angle deviation threshold Δθth, the obstruction strike reaction force fundamental amount Fo0 is rapidly increased in proportion to an increase in the absolute value of the angle deviation Δθx. The angle deviation threshold Δθth is a value that allows determining that the steered wheel 4 is struck by an obstruction, and is set through testing etc. The obstruction strike reaction force fundamental amount Fo0 is set to have such a large absolute value that any further steering-forth operation cannot be performed with human power when the angle deviation 40x is larger than the angle deviation threshold Δθth by a certain degree. Consequently, a reaction force at the time when a tire portion of the steered wheel 4 is struck by an obstruction is reproduced in a region in which the absolute value of the angle deviation 40x is equal to or less than the angle deviation threshold Δθth, and a reaction force at the time when a wheel portion of the steered wheel 4 is struck by an obstruction is reproduced in a region in which the absolute value of the angle deviation Δθx is more than the angle deviation threshold Δθth. The thus computed obstruction strike reaction force fundamental amount Fo0 is output to the multiplier 125.

As illustrated in FIG. 5, the code processing unit 124 receives, as inputs, the flags that are generated by the obstruction strike determination unit 122 that is constituted from the right obstruction strike determination unit 120 and the left obstruction strike determination unit 121. The code processing unit 124 sets the direction in which the obstruction strike reaction force fundamental amount Fo0 is applied based on the flags that are generated by the obstruction strike determination unit 122. The code processing unit 124 outputs "+1" to the multiplier 125 in the case where the first flag F1 is input. The code processing unit 124 outputs "−1" to the multiplier 125 in the case where the second flag F2 is input. The code processing unit 124 outputs "0" to the multiplier 125 in the case where neither of the first flag F1 and the second flag F2 is input.

The multiplier 125 receives, as inputs, the obstruction strike reaction force fundamental amount Fo0 and one of "+1", "−1", and "0" that is selected by the code processing unit 124. The multiplier 125 computes the obstruction strike reaction force Fo by multiplying one of "+1", "−1", and "0" and the obstruction strike reaction force fundamental amount Fo0. The multiplier 125 computes the obstruction strike reaction force Fo with a positive value in order to apply a force that resists a further steering-forth operation to steer the steered wheel 4 toward the right side in the case where "+1" is input from the code processing unit 124. The multiplier 125 computes the obstruction strike reaction force Fo with a negative value in order to apply a force that resists a further steering-forth operation to steer the steered wheel 4 toward the left side in the case where "−1" is input from the code processing unit 124. The multiplier 125 sets the obstruction strike reaction force Fo to "0" in the case where "0" is input from the code processing unit 124, since neither of the right and left sides of the steered wheel 4 is struck by an obstruction.

As illustrated in FIG. 4, the obstruction strike reaction force computation unit 103 outputs the computed obstruction strike reaction force Fo to the reaction force selection unit 106. In this manner, the reaction force selection unit 106 receives the end reaction force Fie and the obstruction strike reaction force Fo as inputs. The reaction force selection unit 106 selects the end reaction force Fie or the obstruction strike reaction force Fo, whichever has a larger absolute value, and outputs the selected reaction force to the adder 105 as a selected reaction force Fsl. The reaction force component computation unit 73 computes the reaction force component Fir as a value obtained by the adder 105 adding the selected reaction force Fsl to the base reaction force Fd, and outputs the reaction force component Fir to the target steering angle computation unit 74 illustrated in FIG. 2.

The functions and the effects of the first embodiment will be described.

(1) In order to communicate a situation in which the steered wheel 4 is struck by an obstruction to the driver via the steering wheel 11, the steering-side control unit 61 is provided with the obstruction strike reaction force computation unit 103 that computes the obstruction strike reaction force Fo. In the obstruction strike reaction force computation unit 103, the code processing unit 124 sets the direction in which the obstruction strike reaction force Fo is applied based on the flags that are generated by the obstruction strike determination unit 122. Since the target reaction force torque Ts* is computed in consideration of the thus computed obstruction strike reaction force Fo, the obstruction strike reaction force Fo for regulating a steering operation that steers the steered wheel 4 to the side on which the steered wheel 4 is struck by an obstruction can be communicated to the driver via the steering wheel 11. Thus, the status of the steered wheel 4 that is struck by an obstruction can be communicated to the driver via the steering wheel 11 more appropriately.

(2) The obstruction strike reaction force fundamental amount Fo0, which is the base of the obstruction strike reaction force Fo, is computed based on the angle deviation Δθx that is the deviation between the steering angle θh and the corresponding steered angle θp. Thus, the obstruction strike reaction force Fo that matches how the steered wheel 4 is struck by an obstruction can be computed. Therefore, the status of the steered wheel 4 that is struck by an obstruction can be communicated to the driver via the steering wheel 11 further appropriately.

(3) The reaction force computation unit 123 always computes the obstruction strike reaction force fundamental amount Fo0 based on the angle deviation Δθx that is the deviation between the steering angle θh and the corresponding steered angle θp. Therefore, the obstruction strike reaction force fundamental amount Fo0 has a value if there is an angle deviation Δθx, not only in a situation in which the steered wheel 4 is struck by an obstruction but also in a situation in which the steered wheel 4 is not struck by an obstruction. For example, in the case where the steering wheel 11 is steered rapidly, there is occasionally an angle deviation Δθx even if the steered wheel 4 is not struck by an obstruction. In the case where neither of the first flag F1 and the second flag F2 is generated, it is considered that the steered wheel 4 is not struck by an obstruction, and the code processing unit 124 outputs "0" to the multiplier 125. Consequently, in the case where it is determined that the steered wheel 4 is not struck by an obstruction, the status of the steered wheel 4 that is not struck by an obstruction can be communicated to the driver via the steering wheel 11.

(4) In the case where the steered wheel 4 falls into a groove, the right side of the steered wheel 4 is struck by an obstruction in some cases, while the left side of the steered wheel 4 is struck by an obstruction in other cases. Also in such a case, it is requested to appropriately communicate the status of the steered wheel 4 to the driver via the steering wheel by adequately applying the obstruction strike reaction force Fo to the side on which the steered wheel 4 is struck by an obstruction. For example, it is conceivable to set the direction in which the obstruction strike reaction force Fo is applied using other parameters such as the steering speed, the steering angle, etc. of the steering wheel 11. In this case, however, the direction in which the obstruction strike reaction force Fo should be applied is indirectly estimated using the other parameters to be set. In the present embodiment, a strike of the steered wheel 4 by an obstruction is determined using the q-axis current value Iqt that is the drive current of the steered-side motor 43, and the direction in which the obstruction strike reaction force Fo is applied is set using the q-axis current value Iqt. Since the direction in which the obstruction strike reaction force Fo should be applied is directly estimated using information on the steered portion 5 side, rather than information on the steering portion 3 side, the direction in which the obstruction strike reaction force Fo is applied can be set more appropriately based on the determination result. Thus, the status of the steered wheel 4 can be communicated to the driver via the steering wheel 11 more appropriately.

The present embodiment may be modified as follows. The following other embodiments may be combined with each other as long as the embodiments do not technically contradict with each other.

In the present embodiment, the reaction force computation unit 123 computes the obstruction strike reaction force fundamental amount Fo0 that is gently increased in proportion to an increase in the angle deviation Δθx in the case where the angle deviation 40x is equal to or less than the angle deviation threshold Δθth. However, the present disclosure is not limited thereto. The obstruction strike reaction force fundamental amount Fo0 may be computed as "0".

In the present embodiment, the reaction force computation unit 123 makes the slope of the obstruction strike reaction force fundamental amount Fo0 with respect to the angle deviation Δθx between a case where the angle deviation Δθx is equal to or less than the angle deviation threshold Δθth and a case where the angle deviation Δθx is more than the angle deviation threshold Δθth. However, the present disclosure is not limited thereto. For example, the reaction force computation unit 123 may compute the obstruction strike reaction force fundamental amount Fo0 as "0" in the case where the angle deviation Δθx is zero, and may compute the obstruction strike reaction force fundamental amount Fo0 such that the absolute value thereof is increased in proportion to an increase in the angle deviation Δθx.

In the present embodiment, the right obstruction strike determination unit 120 and the left obstruction strike determination unit 121 determine that the right side or the left side of the steered wheel 4 is struck by an obstruction based on the q-axis current value Iqt. However, the present disclosure is not limited thereto. For example, the right obstruction strike determination unit 120 and the left obstruction strike determination unit 121 may determine that the right side or the left side of the steered wheel 4 is struck by an obstruction based on the angle deviation Δθx or a steered speed that is a value obtained by differentiating the corresponding steered angle θp, in addition to the q-axis current value Iqt. In this manner, the right obstruction strike determination unit 120 and the left obstruction strike determination unit 121 may determine that the right side or the left side of the steered wheel 4 is struck by an obstruction based on a different parameter.

In the present embodiment, the obstruction strike determination unit 122 determines that the right side of the steered wheel 4 is struck by an obstruction, and determines that the left side of the steered wheel 4 is struck by an obstruction. However, the present disclosure is not limited thereto. The obstruction strike determination unit 122 may determine whether the steered wheel 4 is struck by an obstruction based on whether the absolute value of the q-axis current value Iqt is equal to or more than a threshold, and then determine whether the right side of the steered wheel 4 is struck by an obstruction or whether the left side of the steered wheel 4 is struck by an obstruction. Also in this manner, the obstruction strike determination unit 122 can generate the first flag F1 indicating that the right side of the steered wheel 4 is struck by an obstruction and the second flag F2 indicating that the left side of the steered wheel 4 is struck by an obstruction.

In the present embodiment, the reaction force computation unit 123 computes the obstruction strike reaction force fundamental amount Fo0 that matches the angle deviation Δθx that is the deviation between the steering angle θh and the corresponding steered angle θp. However, the present disclosure is not limited thereto. For example, the reaction force computation unit 123 may compute the obstruction strike reaction force fundamental amount Fo0 in accordance with a different parameter such as computing the obstruction strike reaction force fundamental amount Fo0 that matches the q-axis current value Iqt.

In the present embodiment, the first flag F1 that is generated by the right obstruction strike determination unit 120 is directly input to the code processing unit 124. However, the first flag F1 may be input via a different processing unit. Meanwhile, the second flag F2 that is generated by the left obstruction strike determination unit 121 is directly input to the code processing unit 124. However, the second flag F2 may be input via a different processing unit. The different processing unit receives, as an input, not only the determination result from the obstruction strike determination unit 122 but also the determination result as to overheat protection of the steering-side motor 14 etc., for example, and selectively outputs the determination result that should be given priority, among such determination results, to the code processing unit 124.

In the present embodiment, the right obstruction strike determination unit 120 generates the first flag F1 indicating that the right side of the steered wheel 4 is struck by an obstruction in the case where it is determined that the right side of the steered wheel 4 is struck by an obstruction. However, the right obstruction strike determination unit 120 may generate a flag indicating that the right side of the steered wheel 4 is not struck by an obstruction in the case where it is determined that the right side of the steered wheel 4 is not struck by an obstruction. Meanwhile, the left obstruction strike determination unit 121 generates the second flag F2 indicating that the left side of the steered wheel 4 is struck by an obstruction in the case where it is determined that the left side of the steered wheel 4 is struck by an obstruction. However, the left obstruction strike determination unit 121 may generate a flag indicating that the left side of the steered wheel 4 is not struck by an obstruction in the case where it is determined that the left side of the steered wheel 4 is not struck by an obstruction. In this case, the code processing unit 124 outputs "0" to the multiplier 125 in the case where both the flag indicating that the right side of the steered wheel 4 is not struck by an obstruction and the flag indicating that the left side of the steered wheel 4 is not struck by an obstruction are input.

In the present embodiment, the code processing unit 124 outputs one of "+1", "0", and "−1" based on the flags. However, the code processing unit 124 may output one of "+1" and "−1" based on the flags.

In the present embodiment, the obstruction strike reaction force computation unit 103 uses the q-axis current value Iqt to determine whether the steered wheel 4 is struck by an obstruction. However, the present disclosure is not limited thereto. The obstruction strike reaction force computation unit 103 may use the steered-side q-axis target current value Iqt*.

In the present embodiment, the steering angle ratio between the steering angle θh and the corresponding steered angle θp is constant, that is, the steering angle θh and the corresponding steered angle θp make a one-to-one correspondence. However, the present disclosure is not limited thereto. The steering angle ratio may be variable in accordance with the vehicle speed SPD etc. In this case, the target steering angle θh* and the target corresponding steered angle have different values.

In the present embodiment, the road surface axial force Fer is computed based on the q-axis current value Iqt. However, the present disclosure is not limited thereto. The road surface axial force Fer may be computed by a different method, such as based on variations in the yaw rate or the vehicle speed SPD. Alternatively, the rack shaft 32 may be provided with a pressure sensor that can detect an axial force etc., and the detection result of the sensor may be used as the road surface axial force Fer, for example.

In the present embodiment, the ideal axial force Fib is computed based on the target steering angle θh*. However, the present disclosure is not limited thereto. For example, the ideal axial force Fib may be computed based on the steering angle θh. Alternatively, the ideal axial force Fib may be computed by a different method, such as by taking into account a different parameter such as the steering torque Th and the vehicle speed SPD.

In the present embodiment, the distributed axial force computation unit 113 may compute the distribution gains Gib and Ger by taking into account a parameter other than the vehicle speed SPD. For example, for a vehicle that enables selection of one of a plurality of drive modes that indicate the state of setting of the control pattern for an engine or the like mounted on the vehicle, the drive mode may be used as a parameter for setting the distribution gains Gib and Ger. In this case, the distributed axial force computation unit 113 may be configured to include a plurality of maps with different tendencies with respect to the vehicle speed SPD for each drive mode and compute the distribution gains Gib and Ger by referencing the maps.

In the present embodiment, the target steering angle computation unit 74 sets the target steering angle θh* based on the steering torque Th, the input torque fundamental component Tb*, the reaction force component Fir, and the vehicle speed SPD. However, the present disclosure is not limited thereto. For example, the vehicle speed SPD may not be used if the target steering angle θh* is set based on at least the steering torque Th, the input torque fundamental component Tb*, and the reaction force component Fir.

In the present embodiment, the target steering angle computation unit 74 may compute the target steering angle θh* utilizing a model formula modeled by adding a so-called spring term that uses a spring coefficient determined in accordance with the specifications of suspensions, wheel alignment, or the like.

In the present embodiment, the target reaction force torque computation unit 75 computes the target reaction force torque Ts* by adding the input torque fundamental component Tb* to the fundamental reaction force torque. However, the present disclosure is not limited thereto. For example, the fundamental reaction force torque may be used, as it is, as the target reaction force torque Ts* without adding the input torque fundamental component Tb* thereto.

In the present embodiment, the rack shaft 32 may be supported by a bushing or the like, for example, in place of the first rack-and-pinion mechanism 34. In the present embodiment, the steered-side actuator 41 may be configured such that the steered-side motor 43 is disposed coaxially with the rack shaft 32, the steered-side motor 43 is disposed in parallel with the rack shaft 32, etc., for example.

In the present embodiment, the steering device 2 to be controlled by the steering control device 1 is a linkless steer-by-wire steering device in which the steering portion 3 and the steered portion 5 are mechanically separated from each other. However, the present disclosure is not limited thereto. The steering device 2 may be a steer-by-wire steering device in which the steering portion 3 and the steered portion 5 are mechanically engageable with and disengageable from each other through a clutch.

Figure 7:
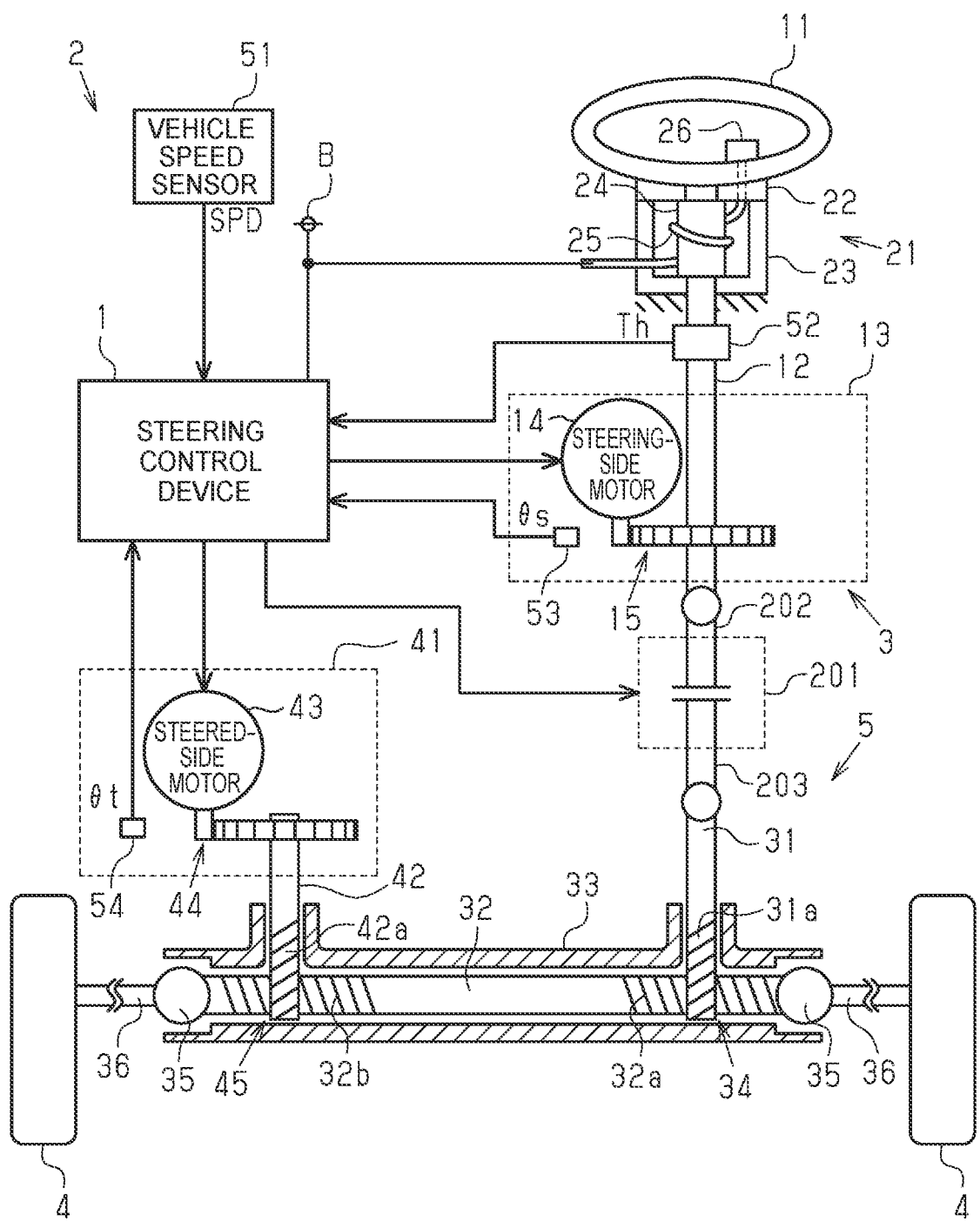
FIG. 7 is a block diagram of a steering device of a steer-by-wire type according to another embodiment.

For example, in the example illustrated in FIG. 7, a clutch 201 is provided between the steering portion 3 and the steered portion 5. The clutch 201 is coupled to the steering shaft 12 via an input-side intermediate shaft 202 that is fixed to an input-side element of the clutch 201, and coupled to the first pinion shaft 31 via an output-side intermediate shaft 203 that is fixed to an output-side element of the clutch 201. The steering device 2 is brought into a steer-by-wire mode when the clutch 201 is disengaged by a control signal from the steering control device 1. The steering device 2 is brought into an electric power steering mode when the clutch 201 is engaged.

What is claimed is:

1. A steering control device for a steering device, the steering device being structured such that power transmission to and from a steering portion is separated from power transmission to and from a steered portion, the steered portion being provided with a steered-side motor and steering a steered wheel in accordance with a steering operation that is input to a steering wheel coupled to the steering portion, the steering control device comprising:
an electronic control unit configured to:
control operation of a steering-side motor so as to apply a steering reaction force that resists the steering operation that is input to the steering wheel, the steering-side motor being provided to the steering portion;
compute an obstruction strike reaction force for regulating a steering operation that steers the steered wheel toward an obstruction, the obstruction strike reaction force being computed based on a current supplied to the steered-side motor and a steering angle deviation, which is determined by a difference between an actual steering angle of the steering wheel and a target steering angle of the steering wheel;
generate determination information indicating that the steered wheel is struck by an obstruction, the determination information including first determination information indicating that a left side of the steered wheel is struck by an obstruction and second determination information indicating that a right side of the steered wheel is struck by an obstruction; and
set a direction in which the obstruction strike reaction force is applied based on the generated determination information.

2. A method for controlling a steering device, the steering device being structured such that power transmission to and from a steering portion is separated from power transmission to and from a steered portion, the steered portion being provided with a steered-side motor and steering a steered wheel in accordance with a steering operation that is input to a steering wheel coupled to the steering portion, the method comprising:
controlling, by an electronic control unit, operation of a steering-side motor so as to apply a steering reaction force that resists the steering operation that is input to the steering wheel, the steering-side motor being provided to the steering portion;
computing, by the electronic control unit, an obstruction strike reaction force for regulating a steering operation that steers the steered wheel toward an obstruction, the obstruction strike reaction force being computed based on a current supplied to the steered-side motor and a steering angle deviation, which is determined by a difference between an actual steering angle of the steering wheel and a target steering angle of the steering wheel;

generating, by the electronic control unit, determination information indicating that the steered wheel is struck by an obstruction, the determination information including first determination information indicating that a left side of the steered wheel is struck by an obstruction and second determination information indicating that a right side of the steered wheel is struck by an obstruction; and setting, by the electronic control unit, a direction in which the obstruction strike reaction force is applied based on the generated determination information.

* * * * *